US008551442B2

(12) United States Patent
Umino et al.

(10) Patent No.: US 8,551,442 B2
(45) Date of Patent: Oct. 8, 2013

(54) REACTOR FOR SYNTHESIZING HYDROGEN SULFIDE, APPARATUS FOR PRODUCING HYDROGEN SULFIDE, APPARATUS FOR PRODUCING SODIUM HYDROGEN SULFIDE, METHOD FOR PRODUCING HYDROGEN SULFIDE, AND METHOD FOR PRODUCING SODIUM HYDROGEN SULFIDE

(71) Applicants: Hiroshi Umino, Kanagawa (JP); Nobuhiro Yamada, Kanagawa (JP); Tsutomu Katagiri, Kanagawa (JP); Hiromitsu Shibuya, Kanagawa (JP); Shuichi Oguro, Kanagawa (JP); Naoyoshi Iwasaki, Kanagawa (JP)

(72) Inventors: Hiroshi Umino, Kanagawa (JP); Nobuhiro Yamada, Kanagawa (JP); Tsutomu Katagiri, Kanagawa (JP); Hiromitsu Shibuya, Kanagawa (JP); Shuichi Oguro, Kanagawa (JP); Naoyoshi Iwasaki, Kanagawa (JP)

(73) Assignee: JGC Corporation, Tokyo (JP)

( * ) Notice: Subject to any disclaimer, the term of this patent is extended or adjusted under 35 U.S.C. 154(b) by 0 days.

(21) Appl. No.: 13/781,757

(22) Filed: Mar. 1, 2013

(65) Prior Publication Data

US 2013/0177496 A1 Jul. 11, 2013

Related U.S. Application Data

(63) Continuation of application No. PCT/JP2012/056615, filed on Mar. 15, 2012.

(30) Foreign Application Priority Data

Aug. 23, 2011 (JP) .................. 2011-181392

(51) Int. Cl.
*B01J 19/00* (2006.01)
*C01B 17/16* (2006.01)
*C01B 17/32* (2006.01)

(52) U.S. Cl.
USPC ...... 423/560; 423/563; 423/DIG. 5; 422/129; 422/160; 422/161; 422/198

(58) Field of Classification Search
USPC ............. 423/560, 563, DIG. 5; 422/129, 160, 422/161, 198
See application file for complete search history.

(56) References Cited

U.S. PATENT DOCUMENTS

| 1,700,578 A * | 1/1929 | Bacon ........................... 423/563 |
| 7,887,777 B2 * | 2/2011 | Wolfert et al. ................ 423/511 |
| 2010/0015036 A1 * | 1/2010 | Wolfert et al. ................ 423/563 |

FOREIGN PATENT DOCUMENTS

| JP | 63-139007 A * | 6/1988 | .............. C01B 17/22 |
| JP | 2010-515658 | 5/2010 | |

OTHER PUBLICATIONS

Elvers et al., "Ullmann's Encyclopedia of Industrial Chemistry", Fifth, Completely Revised Edition, 1996, pp. 467-485, vol. A13.

(Continued)

*Primary Examiner* — Timothy Vanoy
(74) *Attorney, Agent, or Firm* — Jianq Chyun IP Office

(57) ABSTRACT

A reactor for synthesizing hydrogen sulfide in which sulfur and hydrogen are subjected to gas-phase reaction in the absence of a catalyst to synthesize hydrogen sulfide, the reactor including: a reactor body that retains liquid sulfur in a bottom portion thereof; a heating unit that gasifies part of the liquid sulfur; a hydrogen gas supply unit that supplies hydrogen gas into the liquid sulfur; and a heat-exchanging portion provided in a gas-phase reaction region located above the liquid surface of the liquid sulfur in the reactor body, wherein heat-exchanging portion is configured such that the reaction temperature in the gas-phase reaction region is controlled to be within a predetermined temperature range by changing the heat exchange amount per unit volume in a gas-phase reaction region located farther from the liquid surface from the heat exchange amount per unit volume in a gas-phase reaction region located closer to the liquid surface.

21 Claims, 11 Drawing Sheets

(56) References Cited

OTHER PUBLICATIONS

"International Search Report (Form PCT/ISA/210)", mailed on Apr. 24, 2012, with English translation thereof, p. 1-p. 4.
"Notification of Transmittal of The International Search Report and The Written Opinion of The International Searching Authority, or The Declaration (PCT/ISA/220)", mailed on Apr. 24, 2012, with English translation thereof, p. 1-p. 2.
"Written Opinion of The International Searching Authority (PCT/ISA/237)", mailed on Apr. 24, 2012, with English translation thereof, p. 1-p. 8.

* cited by examiner

REACTOR FOR SYNTHESIZING HYDROGEN SULFIDE, APPARATUS FOR PRODUCING HYDROGEN SULFIDE, APPARATUS FOR PRODUCING SODIUM HYDROGEN SULFIDE, METHOD FOR PRODUCING HYDROGEN SULFIDE, AND METHOD FOR PRODUCING SODIUM HYDROGEN SULFIDE

CROSS-REFERENCE TO RELATED APPLICATION

The present application is a continuation of International Application No. PCT/JP2012/056615, filed on Mar. 15, 2012, which claims priority to JP Application 2011-181392, filed on Aug. 23, 2011, the contents of each of which are incorporated herein by reference.

FIELD

The present invention relates to a method for producing hydrogen sulfide by reacting sulfur with hydrogen, and an apparatus for producing hydrogen sulfide used in the method. Furthermore, the present invention also relates to a method for producing sodium hydrogen sulfide by reacting hydrogen sulfide with sodium hydroxide, and an apparatus for producing sodium hydrogen sulfide used in the method.

BACKGROUND

Hydrogen sulfide is a flammable, toxic gas, which is formed by subjecting sulfur compounds contained in oil or natural gas to hydrodesulfurization, and is recovered as solid sulfur by means of a sulfur recovery unit. Hydrogen sulfide is also a valuable compound as a starting material for synthesis of various sulfur-containing compounds. Hydrogen sulfide or sodium hydrogen sulfide formed from hydrogen sulfide and sodium hydroxide has been widely used as a starting material for preparing fine chemicals, such as dyes, agrochemicals, plastics, drugs, and cosmetics, and as a starting material for producing metal sulfides.

As a method for producing hydrogen sulfide from sulfur and hydrogen using a gas-phase reaction, the following two methods are known.

(1) Catalyzed Reaction

In a reaction tube filled with a catalyst, sulfur gas and hydrogen gas react with each other to form hydrogen sulfide. The reaction heat is removed by circulating a heating medium outside the reaction tube. Such a catalyzed reaction is, for example, disclosed in Patent Literature 1 described below.

(2) Uncatalyzed Reaction

An uncatalyzed gas-phase reaction is, for example, illustrated in FIG. 1 on page 474 of Non Patent Literature 1 described below. In the uncatalyzed gas-phase reaction, hydrogen sulfide is produced using a reactor column having a bottom portion that retains liquid sulfur at the boiling temperature thereof and a gas space in which sulfur gas and hydrogen gas are reacted with each other. Hydrogen gas is introduced into liquid sulfur in the bottom portion, and hydrogen gas and sulfur gas react with each other in the gas space to form hydrogen sulfide. The reaction heat of hydrogen sulfide is recovered by being brought into contact with liquid sulfur which is supplied from the upper part of the gas space. The product gas containing hydrogen sulfide and sulfur gas is cooled by a heat exchanger to solidify sulfur, thereby purifying hydrogen sulfide gas.

PTL 1: Japanese Unexamined Patent Application Publication (Translation of PCT Application) No. 2010-515658

NPL 1: Ullmann's Encyclopedia of Industrial Chemistry, Fifth, Completely Revised Edition, 1996, Vol. A13, pp. 467~485.

SUMMARY

Exemplary embodiments are described below.

(1) A reactor for synthesizing hydrogen sulfide in which sulfur and hydrogen are subjected to gas-phase reaction in the absence of a catalyst to synthesize hydrogen sulfide, the reactor including:

a reactor body that retains liquid sulfur in a bottom portion thereof;

a heating unit that gasifies part of the liquid sulfur;

a hydrogen gas supply unit that supplies hydrogen gas into the liquid sulfur; and a heat-exchanging portion provided in a gas-phase reaction region located above the liquid surface of the liquid sulfur in the reactor body, wherein the heat-exchanging portion is configured such that the reaction temperature in the gas-phase reaction region is controlled to be within a predetermined temperature range by changing the heat exchange amount per unit volume in a gas-phase reaction region located farther from the liquid surface from the heat exchange amount per unit volume in a gas-phase reaction region located closer to the liquid surface.

By reducing formation of side reaction products, it is possible to produce high-purity hydrogen sulfide.

(2) The reactor for synthesizing hydrogen sulfide according to Item 1, wherein the heat-exchanging portion is configured such that the heat exchange amount per unit volume decreases with increasing distance from the liquid surface.

(3) The reactor for synthesizing hydrogen sulfide according to Item 1 or 2, wherein the heat-exchanging portion is configured such that the heat-transfer area per unit volume in the gas-phase reaction region located closer to the liquid surface is larger than the heat-transfer area per unit volume in the gas-phase reaction region located farther from the liquid surface.

(4) The reactor for synthesizing hydrogen sulfide according to any one of Items 1 to 3, wherein the predetermined temperature range is 380° C. to 410° C.

By setting the temperature to 410° C. or lower, the $H_2S_2$ concentration can be reduced to less than 10 ppm at a pressure of 0.5 MPa. When the reaction temperature is decreased, the reaction rate decreases. Therefore, the temperature is set to at least 380° C.

(5) The reactor for synthesizing hydrogen sulfide according to any one of Items 1 to 4, wherein a refrigerant of the heat-exchanging portion is supplied at a temperature equal to or higher than the freezing point of sulfur.

(6) The reactor for synthesizing hydrogen sulfide according to any one of Items 1 to 5, wherein the heat-exchanging portion includes a plurality of heat exchangers.

(7) The reactor for synthesizing hydrogen sulfide according to any one of Items 1 to 6, wherein the heat-exchanging portion is provided with a flow-straightening member that has a plurality of holes through which the gas passes.

The gas flow from the lower portion to the upper portion is straightened and uniformly distributed, and reflux to the lower portion caused by cooling is prevented. Thus, it is possible to achieve a theoretical conversion according to the height of the gas-phase portion.

(8) The reactor for synthesizing hydrogen sulfide according to any one of Items 1 to 7, further including:

a temperature sensor that senses the gas temperature of the gas-phase reaction region; and a controller that controls the heat exchange amount in each heat-exchanging portion such that the sensed temperature is a predetermined value.

(9) The reactor for synthesizing hydrogen sulfide according to any one of Items 1 to 8, wherein, in the case where the amount of heat released from the surface of the reactor body is larger than the amount of heat generated by the hydrogen sulfide reaction heat, the heat-exchanging portion is configured so as to heat the reactor body in order to maintain the reaction temperature in the gas-phase reaction region within a predetermined temperature range.

Even when the column diameter of the reactor body is small, it is possible to produce high-purity hydrogen sulfide by reducing formation of side reaction products.

(10) An apparatus for producing hydrogen sulfide including:
the reactor for synthesizing hydrogen sulfide according to any one of Items 1 to 9; and
a hydrogenation reactor that synthesizes hydrogen sulfide by reacting unreacted sulfur gas and hydrogen gas discharged from the reactor for synthesizing hydrogen sulfide using a hydrogenation catalyst. Unreacted sulfur gas can be converted by hydrogen gas into hydrogen sulfide gas.

(11) The apparatus for producing hydrogen sulfide according to Items 1 to 10, further including a liquefier that liquefies hydrogen sulfide.

(12) An apparatus for producing sodium hydrogen sulfide in which sodium hydrogen sulfide is synthesized, the apparatus including:
the reactor for synthesizing hydrogen sulfide according to any one of Items 1 to 11;
a hydrogenation reactor that synthesizes hydrogen sulfide by reacting unreacted sulfur gas and hydrogen gas discharged from the reactor for synthesizing hydrogen sulfide using a hydrogenation catalyst; and
a reactor for synthesizing sodium hydrogen sulfide in which hydrogen sulfide is reacted with an aqueous sodium hydroxide solution to synthesize sodium hydrogen sulfide.

(13) A method for producing hydrogen sulfide in which sulfur and hydrogen are subjected to gas-phase reaction in the absence of a catalyst to synthesize hydrogen sulfide, the method including the steps of:
heating part of liquid sulfur retained in a lower portion of a reactor;
supplying hydrogen gas into the liquid sulfur;
subjecting sulfur gas generated by the heating and the hydrogen gas to gas-phase reaction in a gas-phase reaction region located above the liquid surface of the liquid sulfur in the reactor; and
removing heat such that the reaction temperature in the gas-phase reaction region is controlled to be within a predetermined temperature range by changing the heat exchange amount per unit volume in a gas-phase reaction region located farther from the liquid surface from the heat exchange amount per unit volume in a gas-phase reaction region located closer to the liquid surface.

(14) The method for producing hydrogen sulfide according to Item 13, wherein, in the step of removing heat, heat is removed such that the heat exchange amount per unit volume decreases with increasing distance from the liquid surface.

(15) The reactor for synthesizing hydrogen sulfide according to Item 13 or 14, wherein the predetermined temperature range is 380° C. to 410° C.

(16) The hydrogen sulfide production reaction according to any one of Items 13 to 15, wherein the heat removal is performed using a refrigerant at a temperature equal to or higher than the freezing point of sulfur.

(17) The method for producing hydrogen sulfide according to any one of Items 13 to 16, wherein the gas passes through a flow-straightening member having a plurality of holes provided in a heat-exchanging portion where the heat removal is performed.

(18) The method for producing hydrogen sulfide according to any one of Items 13 to 17, wherein unreacted sulfur gas and hydrogen gas discharged from the reactor for synthesizing hydrogen sulfide are reacted with each other using a hydrogenation catalyst to perform conversion into hydrogen sulfide.

(19) The method for producing hydrogen sulfide according to any one of Items 13 to 18, wherein, the step of removing heat includes a step of heating in order to maintain the reaction temperature in the gas-phase reaction region within a predetermined temperature range in the case where the amount of heat released from the surface of the reactor body is larger than the amount of heat generated by the hydrogen sulfide reaction heat.

(20) The method for producing hydrogen sulfide according to any one of Items 13 to 19, wherein hydrogen sulfide is liquefied.

(21) A method for producing sodium hydrogen sulfide in which sodium hydrogen sulfide is formed, the method including:
reacting hydrogen sulfide formed by the method for producing hydrogen sulfide according to any one of Items 13 to 19 with an aqueous sodium hydroxide to form sodium hydrogen sulfide.

BRIEF DESCRIPTION OF DRAWINGS

These and other objects and features of the present invention will become clearer from the following description of the preferred embodiments given with reference to the attached drawings, wherein.

DESCRIPTION OF EMBODIMENTS

Figure 1:
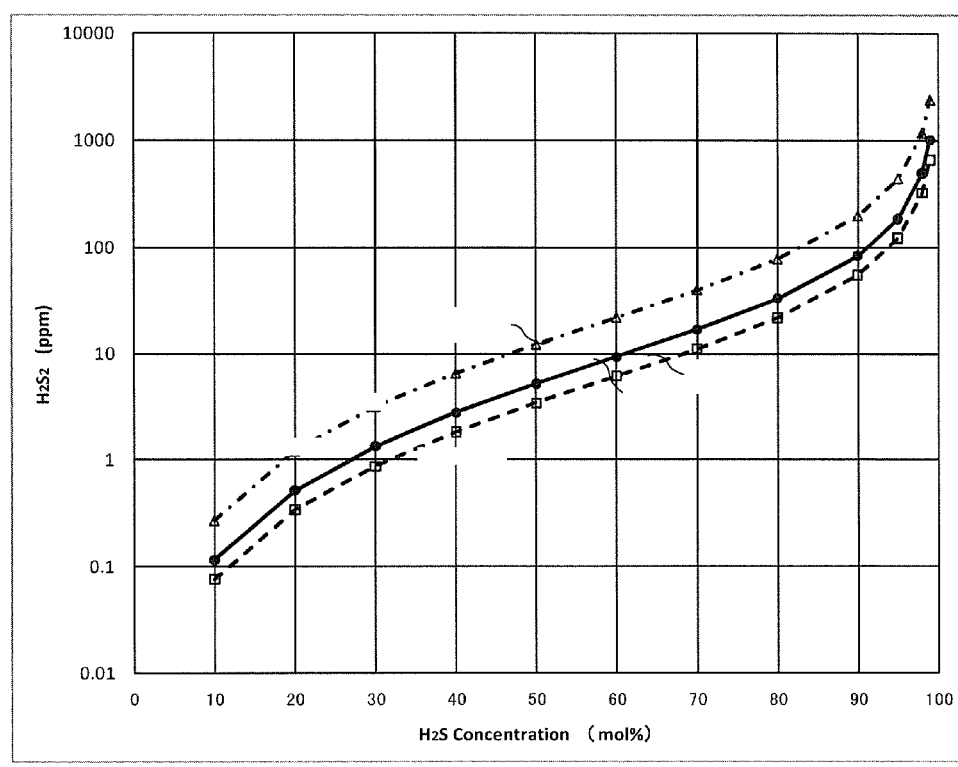
FIG. 1 is a graph illustrating the relationship between the hydrogen sulfide concentration and the $H_2S_2$ concentration in equilibrium.

In the catalyzed reaction for hydrogen sulfide, when the sulfur concentration is high, the temperature rise due to the reaction heat increases, and the catalyst is abnormally heated, which may result in degradation. Consequently, measures for removing heat are necessitated in order to prevent this, which complicates the structure of the reactor. Furthermore, the catalyst after use is sulfurized, and there is a possibility that the catalyst may ignite in contact with air. Therefore, periodic maintenance is not easy.

In the synthesis of hydrogen sulfide, by decreasing the amount of impurities, such as hydrogen polysulfides (chemical substances represented by the chemical formula $H_2S_x$), it is possible to contribute to simplification of the purification process, improvement of economic efficiency, and improvement of quality of the end product synthesized using hydrogen sulfide as a starting material. Therefore, when hydrogen sulfide is synthesized, it is desirable to prevent formation of hydrogen polysulfides which are side reaction products.

When the reaction temperature is increased in order to increase the conversion into hydrogen sulfide, at the same time, the conversion into impurities, such as hydrogen polysulfides ($H_2S_x$) which are side reaction products, is also increased. Consequently, in order to produce high-purity hydrogen sulfide using an uncatalyzed reaction, it is needed to synthesize hydrogen sulfide at a temperature that results in a low conversion into hydrogen polysulfides and the like.

In the known uncatalyzed gas-phase reaction, when gas-liquid contact takes place between the starting material gas and liquid sulfur supplied from the upper part, heat recovery and cooling of the reactant gas are performed by using liquid sulfur. However, if there is a space in which the gas-liquid contact does not take place, the uncatalyzed gas-phase reaction proceeds uncontrollably in the space, and the reaction temperature increases abnormally, resulting in an increase in the concentration of hydrogen polysulfides ($H_2S_x$). With inclusion of such impurities, hydrogen sulfide which is undesirable as a starting material for preparing fine chemicals is produced.

As a result of studies based on these findings, it has been found that, by removing a larger amount of reaction heat from a gas-phase reaction region located closer to the surface of sulfur liquid than from a gas-phase reaction region located farther from the surface of sulfur liquid so as to set the reaction temperature to a predetermined value, formation of hydrogen polysulfides can be prevented, thus achieving a technique for producing hydrogen sulfide with a small amount of side reaction products. That is, according to an aspect, an object of the present invention is to produce high-purity hydrogen sulfide by reducing formation of side reaction products.

According to the present invention, it is possible to produce high-purity hydrogen sulfide by reducing formation of side reaction products.

With reference to the drawings, descriptions are made below on [1] concentrations of hydrogen sulfide and hydrogen polysulfides, [2] reactor for synthesizing hydrogen sulfide, [3] apparatus for producing hydrogen sulfide, and [4] apparatus for producing sodium hydrogen sulfide in that order.

[1] Concentrations of Hydrogen Sulfide and Hydrogen Polysulfides

The hydrogen sulfide formation reaction proceeds in accordance with the formula 1 below. With formation of hydrogen sulfide, hydrogen polysulfides are also formed in accordance with the reaction formula 2 below. In the description below, hydrogen disulfide ($H_2S_2$) which is a hydrogen polysulfide having the highest concentration in the hydrogen sulfide formation reaction is described.

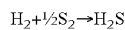  (Formula 1)

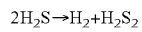  (Formula 2)

FIG. 1 is a graph illustrating the relationship between the hydrogen sulfide concentration and the $H_2S_2$ concentration in equilibrium in a ternary system of $H_2$, $H_2S$, and $H_2S_2$. FIG. 1 includes $H_2S_2$ concentration correlation curves 1001, 1002, and 1003 at 380° C., 410° C., and 500° C., respectively, at a pressure of 0.5 MPaG. In the graph illustrated in FIG. 1, the vertical axis indicates the equilibrium concentration of $H_2S_2$ [molppm], and the horizontal axis indicates the equilibrium concentration of hydrogen sulfide [mol %]. In the hydrogen sulfide formation reaction, as the hydrogen sulfide concentration increases, the $H_2S_2$ concentration also increases. This state is illustrated in FIG. 1 by the hydrogen sulfide concentration and the $H_2S_2$ concentration correlation curves 1001 to 1003. As illustrated in the graph, as the equilibrium temperature increases, the $H_2S_2$ concentration relative to the $H_2S$ concentration increases.

Furthermore, the formula 2 represents an endothermic reaction, and as the temperature increases, the $H_2S_2$ concentration increases. Since the reaction rate increases as the temperature increases, it is preferable to increase the temperature as much as possible to reduce the size of the reactor. On the other hand, in view of reaction equilibrium, as the temperature increases, the $H_2S_2$ concentration increases.

Accordingly, in order to set the $H_2S_2$ concentration to a certain concentration or less specified in the product specification for hydrogen sulfide, temperature control is needed. For example, regarding the concentration correlation curve 1001, in the case where the hydrogen sulfide concentration in the purified gas is 60%, in order to reduce the $H_2S_2$ concentration to less than 10 ppm, it is needed to control the reaction temperature to be 410° C. or lower at a pressure of 0.5 MPa. When the temperature becomes higher than the reaction temperature, the $H_2S_2$ concentration exceeds 10 ppm. Thus, the reaction temperature of hydrogen sulfide is preferably 410° C. or lower. On the other hand, when the reaction temperature is decreased, the reaction rate decreases. Therefore, the temperature is preferably at least 380° C. or higher.

Figure 2:
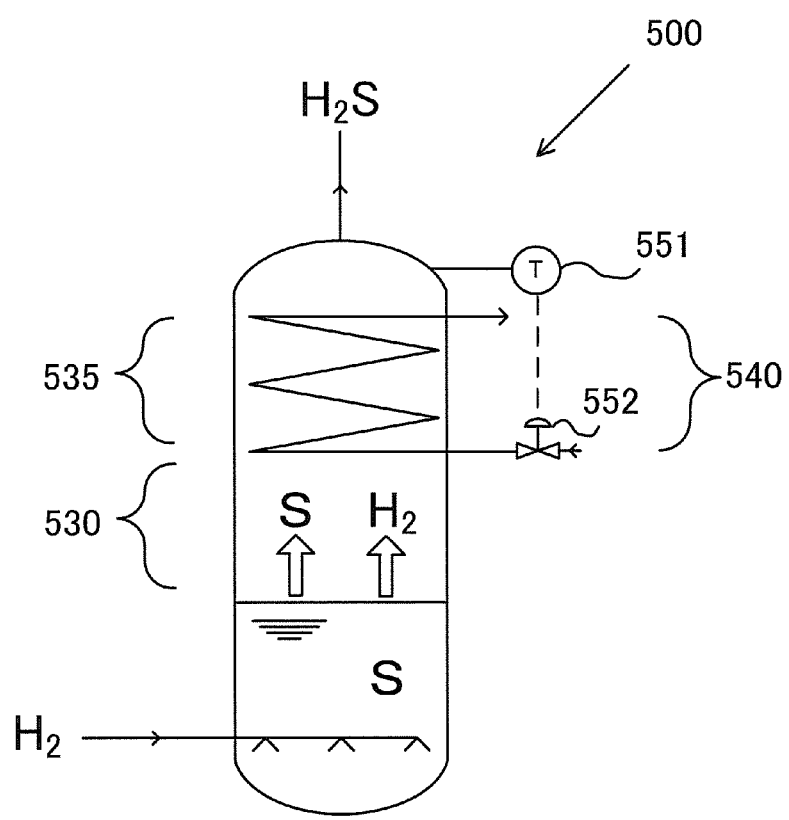
FIG. 2 is a view illustrating an example of a reactor for synthesizing hydrogen sulfide in which temperature control is insufficient.

FIG. 2 is a reference view illustrating an example of a reactor for synthesizing hydrogen sulfide in which temperature control is insufficient. In a reactor for synthesizing hydrogen sulfide 500 illustrated in FIG. 2, sulfur gas obtained by heating and gasifying liquid sulfur retained in the bottom portion with a heater or the like (not illustrated) and hydrogen gas passed through the liquid sulfur react with each other in a gas-phase reaction region 530 to form hydrogen sulfide. At this time, even if the reaction heat in a gas-phase reaction region 535 is removed by a heat exchanger 540, unless the reaction heat is removed in the gas-phase reaction region 530, the reaction temperature increases in the gas-phase reaction region 530, and the $H_2S_2$ concentration increases and exceeds the product specification.

[2] Reactor for Synthesizing Hydrogen Sulfide

Figure 3:
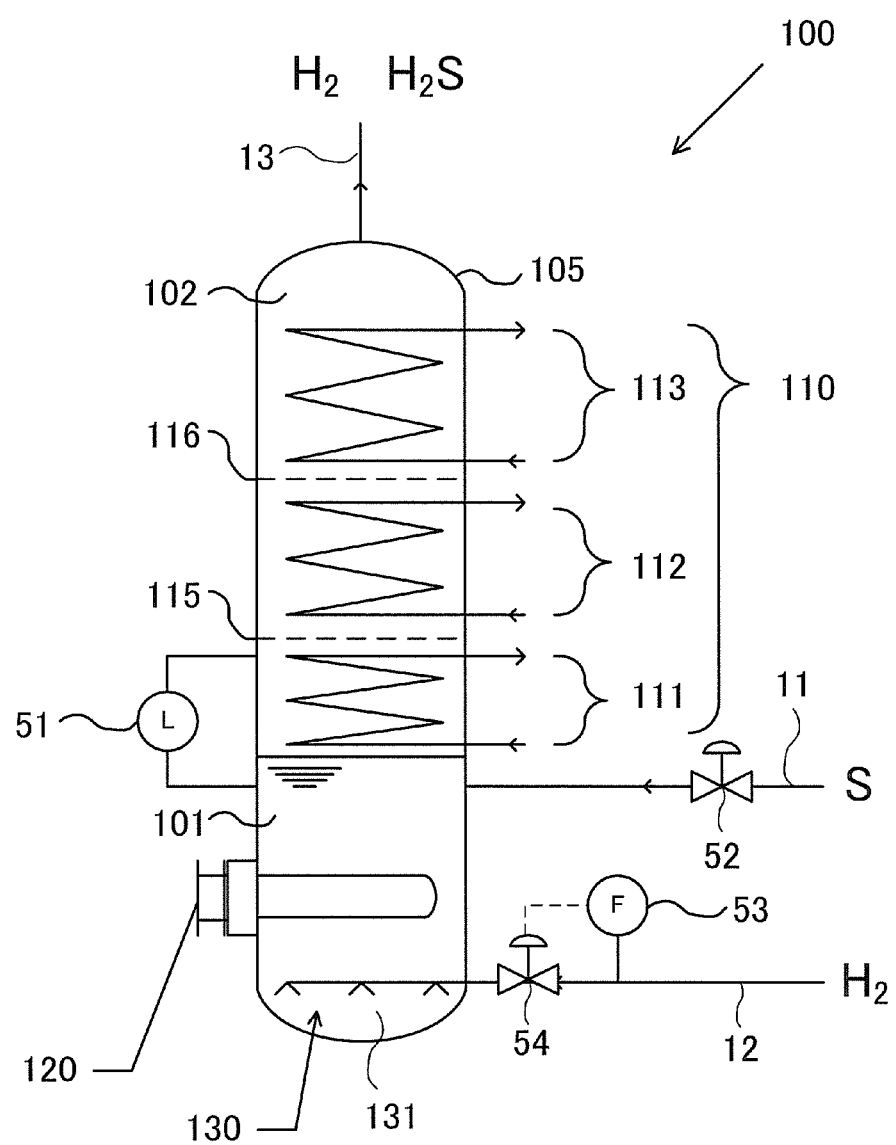
FIG. 3 is a view illustrating a first example of a reactor for synthesizing hydrogen sulfide.

FIG. 3 is a view illustrating a first example of a reactor for synthesizing hydrogen sulfide according to an embodiment of the present invention. A reactor for synthesizing hydrogen sulfide 100 illustrated in FIG. 3 includes a reactor body 105 that can retain liquid sulfur at a bottom portion thereof, a heat-exchanging portion 110 that maintains the temperature of the reaction region in the reactor body 105 at a constant level, a heating unit 120 that heats liquid sulfur retained in the reactor body 105 and gasifies part of the liquid sulfur, and a hydrogen supply unit 130 that supplies hydrogen gas into the liquid sulfur. Furthermore, a liquid sulfur feed line 11, a hydrogen gas feed line 12, and a product gas discharge line 13 are provided. In the reactor for synthesizing hydrogen sulfide 100, the inside of the reactor body 105 is used as a liquid sulfur-retaining portion 101 that retains the liquid sulfur and as a gas-phase reaction region 102 which is a space where an uncatalyzed gas-phase reaction takes place. The heat-exchanging portion 110 of the present invention includes three heat exchangers 111 to 113 and is configured such that the heat exchange volume of the heat exchanger 111 located closest to the surface of liquid sulfur is largest and the heat exchange volume decreases in the order of the heat exchanger 112 and the heat exchanger 113.

The heating unit 120 includes a temperature-controllable heat transfer coil or the like (not illustrated) and heats liquid sulfur so that sulfur can be gasified. Sulfur gas which has been gasified moves up from the liquid surface into the gas-phase portion. The heating unit 120 supplies the amount of heat needed for supplying sulfur gas needed for the hydrogen sulfide formation reaction under the reaction conditions described above.

The reactor for synthesizing hydrogen sulfide 100 includes a liquid level controller 51 that detects the liquid level of the liquid sulfur-retaining portion 101 and controls the liquid level at a predetermined position. The liquid sulfur feed line 11 is connected to a preliminary heating tank for starting material sulfur (not illustrated), and is also provided with a flow control valve 52 for the liquid sulfur heated in the preliminary heating tank. The liquid level controller 51 detects the liquid level of the liquid sulfur, and opens the flow control valve 52 when the liquid sulfur lowers from the predetermined liquid level so that the liquid sulfur can be supplied into the reactor body 105, thereby controlling the liquid level of the liquid sulfur-retaining portion 101 to be constant.

The hydrogen gas supply unit 130 has a supply nozzle 131 that supplies hydrogen gas in a dispersed manner into the liquid sulfur-retaining portion 101. Hydrogen gas supplied from the nozzle 131 moves upward, in the form of bubbles, through the liquid sulfur-retaining portion 101 and reaches the gas-phase reaction region 102 while being accompanied by sulfur gas. Furthermore, the hydrogen gas feed line 12 connected to the hydrogen supply nozzle 131 is provided with a hydrogen gas flow control valve 54 and a flow controller 53 that detects the flow rate of hydrogen gas and controls the flow rate to be a predetermined rate. The flow controller 53 controls the flow rate to be a predetermined rate needed for supplying hydrogen gas needed for the hydrogen sulfide formation reaction.

Figure 4:
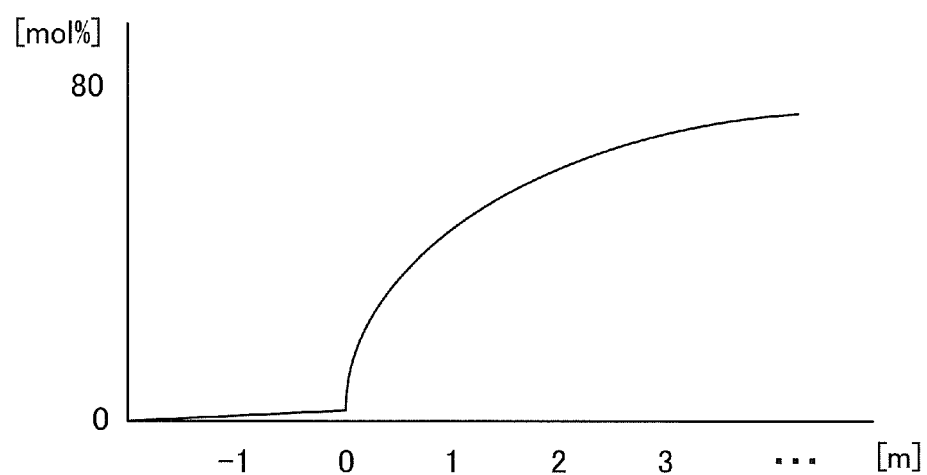
FIG. 4 is a graph illustrating an example of the relationship between the hydrogen sulfide concentration and the height from the liquid surface in an uncatalyzed gas-phase reaction.

A. Structure of Heat-Exchanging Portion that Removes Larger Amount of Heat in Gas-Phase Reaction Region Closer to Liquid Surface FIG. 4 is a graph illustrating an example of the relationship between the hydrogen sulfide concentration and the height from the surface of the liquid sulfur retained in the reactor body 105. In the graph illustrated in FIG. 4, the vertical axis indicates the hydrogen sulfide concentration [mol %], and the horizontal axis indicates the height from the liquid surface [m] in the case where the surface of liquid sulfur is considered as "0". It is clear that the reaction rate for formation of hydrogen sulfide increases as the height from the liquid surface decreases. For example, it is clear that, within the range of 1 [m] from the liquid surface, the conversion is high, and removal of reaction heat and temperature control are needed in the range.

As illustrated in FIG. 4, the conversion is high in the vicinity of the liquid surface, and the conversion per unit height decreases with increasing distance from the liquid surface. The reason for this is that, in the vicinity of the liquid surface, the hydrogen sulfide concentration is low and the sulfur concentration and the hydrogen concentration are high. When the conversion is high, the reaction temperature tends to increase owing to the reaction heat. Accordingly, as described later with reference to FIGS. 3, 5A, and 5B, by configuring such that the heat exchange amount of heat exchangers 111 to 113 increases with decreasing distance from the liquid surface, it is possible to prevent the reaction temperature from rising above a predetermined temperature, and it is possible to prevent excessive formation of hydrogen polysulfides. Furthermore, by preventing the reaction temperature from falling from a predetermined temperature, it is possible to prevent a decrease in the reaction rate.

B. Structure of Heat-Exchanging Portion that Avoids Supercooling

When the amount of heat removal becomes larger than the hydrogen sulfide reaction heat in the heat-exchanging portion, the reaction temperature decreases, and the hydrogen sulfide formation reaction stops. As a result, unreacted hydrogen and sulfur increase and flow out of the reactor for synthesizing hydrogen sulfide 100. Consequently, when the amount of heat removal is excessively larger than the hydrogen sulfide reaction heat in a heat exchanger located closer to the liquid surface or when the amount of heat removal is excessively larger than the hydrogen sulfide reaction heat in a heat exchanger located farther from the liquid surface, the hydrogen sulfide formation reaction stops, which is a problem. Therefore, the heat-exchanging portion is configured such that a larger amount of heat is removed from a gas-phase reaction region located closer to the liquid surface than from a gas-phase reaction region located farther from the liquid surface, and the hydrogen sulfide reaction heat that decreases with increasing distance from the liquid surface in the gas-phase reaction region is appropriately removed so as not to cause excessive removal of heat.

C. Detailed Example of Heat-Exchanging Portion

Figure 5A:
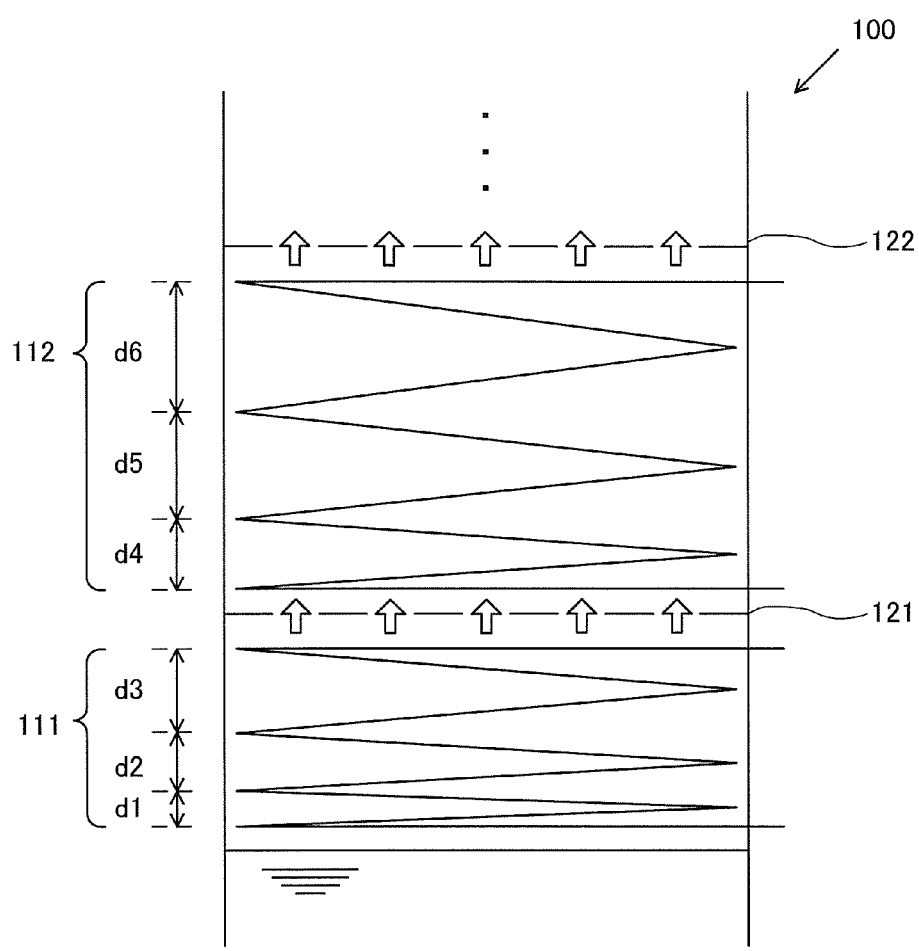
FIG. 5A is a view illustrating a detailed example of a heat exchanger.

FIG. 5A is a view illustrating a detailed example of a heat exchanger. As described above, the heat-exchanging portion is configured such that the hydrogen sulfide reaction heat in the gas-phase reaction region is appropriately removed. However, in the case where the refrigerant temperature is decreased and the amount of heat removal is controlled by the temperature difference delta T, if the temperature of the tube is lower than the freezing point of sulfur, sulfur solidifies on the surface of the tube, resulting in a decrease in the heat transfer coefficient, and the heat exchange amount in the heat-exchanging portion is decreased. Therefore, in the detailed example of the heat-exchanging portion described below, by increasing the heat-transfer area while maintaining the temperature difference delta T in a certain range, the heat exchange amount is changed.

A heat exchanger 111 is a tube having a helical shape, which cools the gas-phase reaction region 102 inside the reactor body 105. A refrigerant flowing through the tube is supplied at a temperature equal to or higher than the freezing point of sulfur. As the refrigerant, for example, oil or steam is used. The heat exchanger 111 illustrated in FIG. 5A has a helical shape including a plurality of loops. In the heat exchanger 111, a refrigerant is supplied from the lower end of the tube and is withdrawn from the upper end of the tube. Although not illustrated in FIG. 5A, the tube of the heat exchanger 111 is configured to fill the gas-phase space inside the reactor and to intersect with the gas that is moving up from liquid sulfur. For example, the heat exchanger 111 may be configured to have a plurality of loops extending from the axis of the reactor in the circumferential direction. The same applies to other heat exchangers inside the reactor.

By setting the distances d1, d2, and d3 between loops in the perpendicular direction (here, $d1 \le d2 \le d3$) so as to decrease with decreasing distance from the liquid surface, the heat exchange amount (amount of heat removal) per unit volume and the heat-transfer area in the gas-phase reaction region 102 increase with decreasing distance from the liquid surface in the heat exchanger 111. As in the heat exchanger 111, in the heat exchanger 112, by setting the distances d4, d5, and d6 between loops (here, d4≤d5≤d6) so as to decrease with decreasing distance from the liquid surface, the heat exchange amount (amount of heat removal) per unit volume and the heat-transfer area in the gas-phase reaction region 102 increase with decreasing distance from the liquid surface.

Furthermore, as illustrated in FIG. 5A, since the relationship (d1+d2+d3)<(d4+d5+d6) is satisfied, the heat exchanger 111 has a smaller occupied area in the gas-phase reaction region 102 than that of the heat exchanger 112. However, since the heat exchanger 111 has a heat exchange amount that is equal to or larger than that of the heat exchanger 112, the heat exchangers 111 and 112 are configured such that the heat exchange amount per volume in the gas-phase reaction region 102 increases with decreasing distance from the liquid surface. The heat exchanger 111 located closest to the liquid surface is arranged so as to cool the region within a height of 1 [m] from the liquid surface.

Although the heat exchangers 111 and 112 only are illustrated in detail in FIG. 5A, in the heat exchanger 113, the distances between loops in the perpendicular direction similarly decrease with decreasing distance from the liquid surface.

Figure 5B:
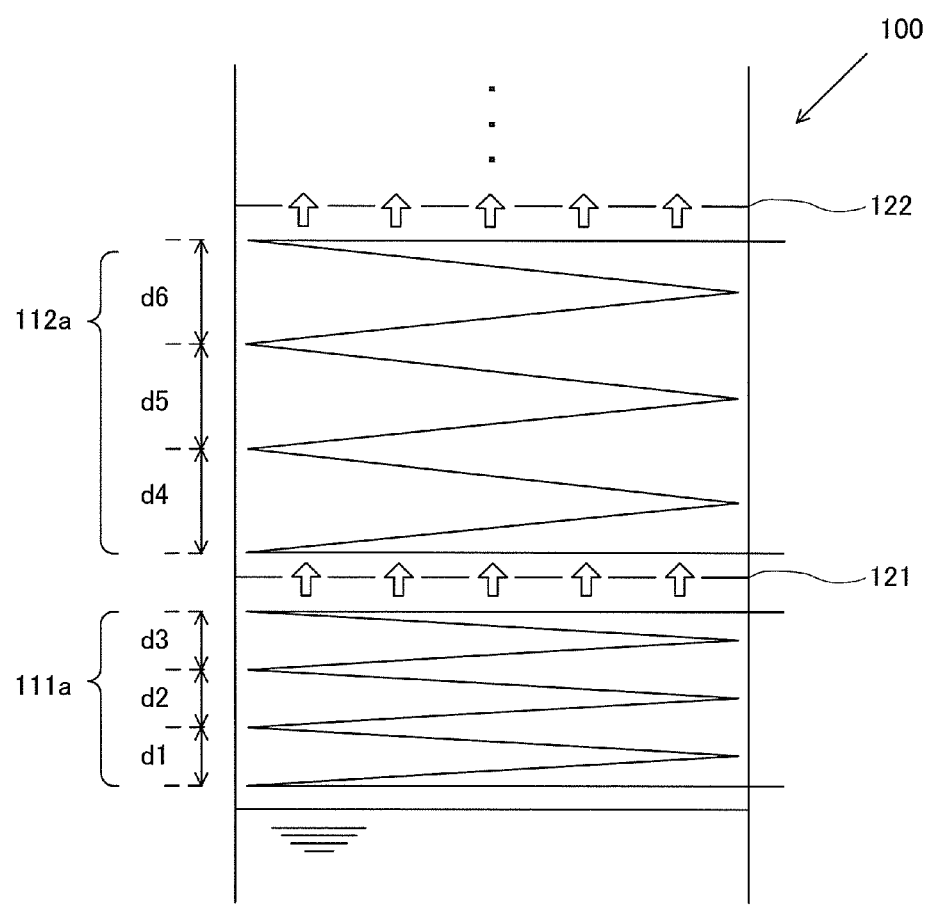
FIG. 5B is a view illustrating another detailed example of a heat exchanger.

FIG. 5B is a view illustrating another detailed example of a heat exchanger. In FIG. 5A, distances between loops in the perpendicular direction satisfy the relationships d1<d2<d3 and d4<d5<d6. As illustrated in FIG. 5B, heat exchangers 111a and 112a may be configured such that the distances between loops in the perpendicular direction are the same in each of the heat exchangers 111a and 112a (d1=d2=d3, d4=d5=d6), and the distance between loops in the perpendicular direction in the heat exchanger 111 is smaller than the distance between loops in the perpendicular direction in the heat exchanger 112 (d1<d4). The same applies to a heat exchanger 113a (not illustrated).

Referring back to FIG. 3, the heat exchangers 111 to 113 constituting the heat-exchanging portion 110 are arranged so as to occupy a space extending from the liquid surface of the liquid sulfur-retaining portion 102 to the product gas discharge line 13 in order to appropriately remove the hydrogen sulfide reaction heat in the gas-phase reaction region 102. As illustrated in FIG. 3, use of multiple heat exchangers is suitable as means for maintaining the reaction temperature as constant as possible in the gas-phase space so as not to increase the $H_2S_2$ concentration.

As described with reference to FIGS. 3, 5A and 5B, the heat exchangers 111 to 113 constituting the heat-exchanging portion 110 are configured such that the heat exchange amount for heat removal increases with decreasing distance from the liquid surface. Therefore, the hydrogen sulfide reaction temperature is prevented from rising above a predetermined temperature, and excessive formation of hydrogen polysulfides can be prevented. Furthermore, by preventing the reaction temperature from falling from a predetermined temperature, it is possible to prevent a decrease in the reaction rate. Furthermore, in the heat exchangers 111 to 113, by appropriately removing the hydrogen sulfide reaction heat in the gas-phase reaction region, which decreases with increasing distance from the liquid surface, it is also possible to prevent the hydrogen sulfide reaction from stopping.

As described above, in the reactor for synthesizing hydrogen sulfide 100, the reaction temperature in the gas-phase reaction region is controlled to be within a predetermined temperature range by changing the heat exchange amount per unit volume for heat removal in a gas-phase reaction region located farther from the liquid surface from the heat exchange amount per unit volume for heat removal in a gas-phase reaction region located closer to the liquid surface. Therefore, it is possible to product high-purity hydrogen sulfide by reducing formation of side reaction products.

D. Flow-Straightening Member

In the heat exchangers 111 to 113 constituting the heat-exchanging portion 110, flow-straightening plates 115 and 116 having a plurality of holes (FIG. 3 or FIGS. 5A and 5B) are arranged at appropriate positions in the middle thereof. The gas moving up from the liquid surface passes through the plurality of holes, and portions other than the holes prevent reflux of cold gas. In such a manner, by arranging the flow-straightening plates 115 and 116 among the heat exchangers 111 to 113, the gas flow from the lower portion to the upper portion is straightened and uniformly distributed, and reflux to the lower portion caused by cooling is prevented, and it is possible achieve a theoretical conversion according to the height of the gas-phase portion as illustrated in FIG. 4. Therefore, by configuring the heat exchangers 111 to 113 constituting the heat-exchanging portion 110 on the basis of the theoretical conversion, the hydrogen sulfide reaction temperature is prevented from rising above a predetermined temperature, and excessive formation of hydrogen polysulfides can be prevented. Furthermore, by preventing the reaction temperature from falling from a predetermined temperature, it is possible to prevent a decrease in the reaction rate.

Figure 6:
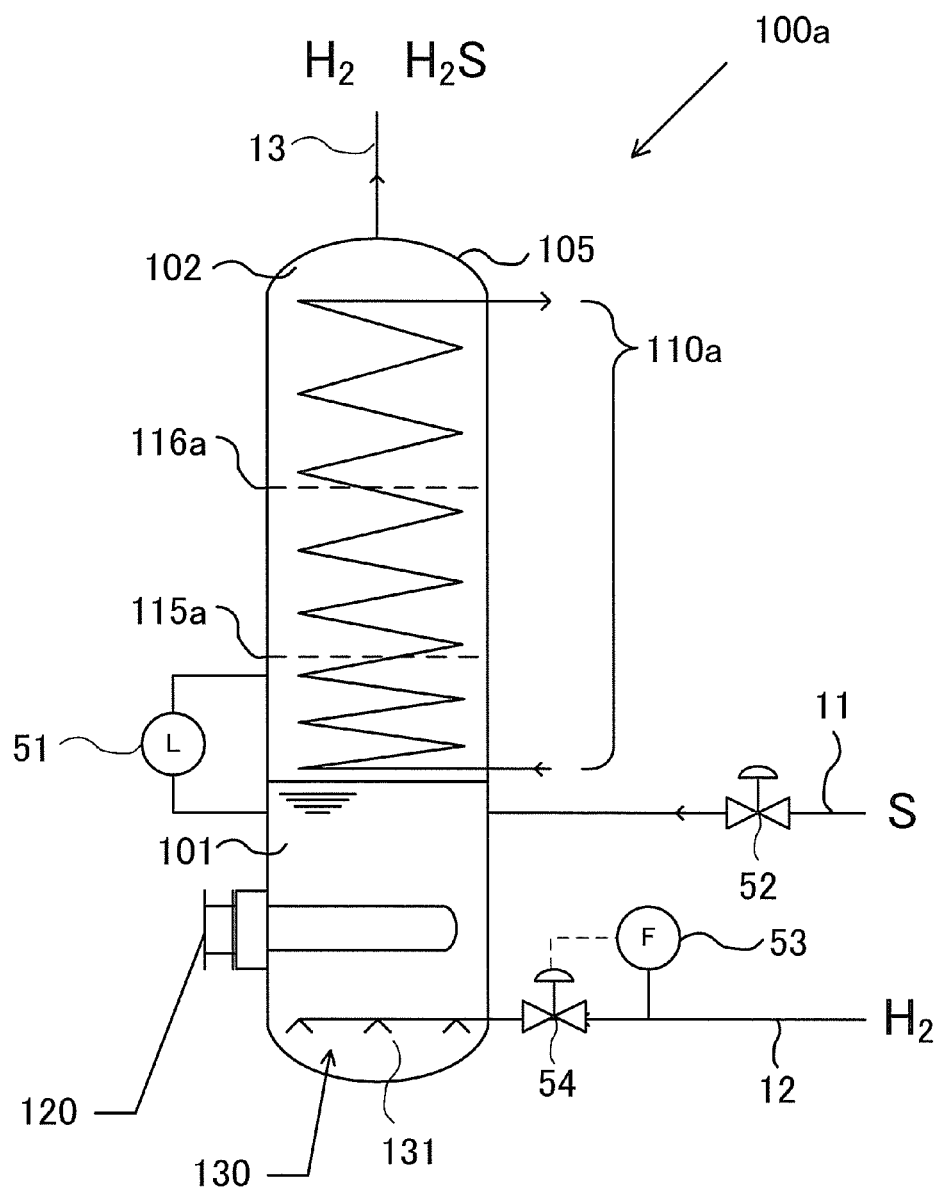
FIG. 6 is a view illustrating another example of a reactor.

FIG. 6 is a view illustrating a modification example of the reactor illustrated in FIG. 3. A reactor 100 illustrated in FIG. 6 has the same structure as that of the reactor 100 illustrated in FIG. 3 except for a heat exchanger and flow-straightening plates, and thus a description of the same structure is omitted. In the reactor for synthesizing hydrogen sulfide 100, the number of heat exchangers provided is one, and there is no need to provide a series of heat exchangers. Therefore, the reactor 100 is suitable in the case where the hydrogen sulfide reaction heat is smaller than that of the reactor for synthesizing hydrogen sulfide 100, the case where the flow rate of the fluid on the tube side is high, or the like. A heat exchanger 110a serving as the heat-exchanging portion 110 is configured such that the heat exchange amount (amount of heat removal) per unit volume and the heat-transfer area in the gas-phase reaction region 102 increase with decreasing distance from the liquid surface. Therefore, the hydrogen sulfide reaction temperature is prevented from rising above a predetermined temperature, and excessive formation of hydrogen polysulfides can be prevented.

As described above, the heat-exchanging portion 110 of the present invention may be configured to include one heat exchanger or a plurality of heat exchangers as long as, basically, the heat exchange volume on the side closer to the surface of liquid sulfur is larger. Moreover, in addition to the configuration in which the heat exchange volume continuously changes over the entire heat-exchanging portion, all of the configurations in which the heat exchange volume changes stepwise, discontinuously such that the heat exchange volume on the side closer to the liquid surface is larger are covered by the present invention.

Flow-straightening plates 115a and 116a serving as flow-straightening members are not arranged among a plurality of heat exchangers constituting the heat-exchanging portion 110, but are arranged so as to pass through the heat-exchanging portion 110a including one heat exchanger. The flow-straightening plates 115a and 116a straighten the gas flow from the lower portion to the upper portion to achieve uniformly heat-exchanging between tube and fluid, and prevent reflux to the lower portion caused by cooling. Thus, it is possible achieve a theoretical conversion according to the height of the gas-phase portion.

E. Temperature Control

Figure 7:
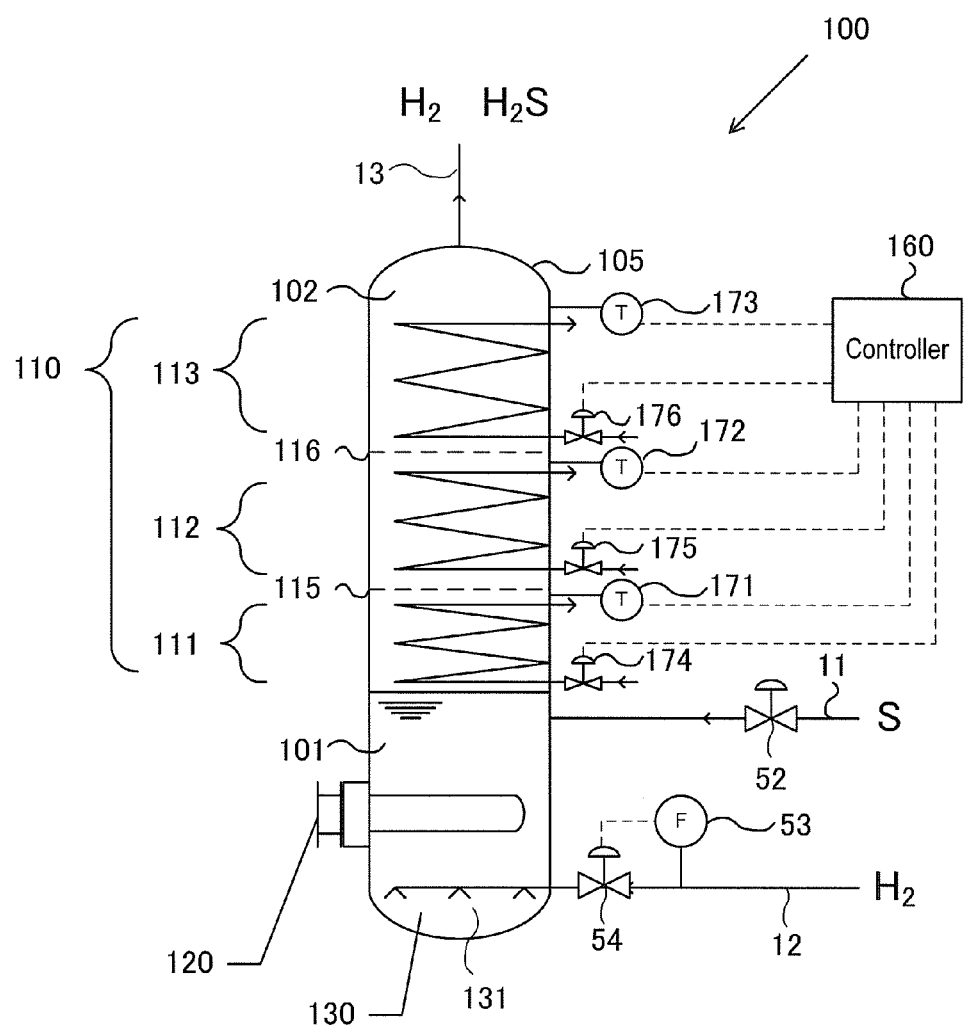
FIG. 7 is a view illustrating an example of a reactor for synthesizing hydrogen sulfide in which the reaction temperature of hydrogen sulfide is controlled.

FIG. 7 is a view illustrating an example of a reactor for synthesizing hydrogen sulfide in which by controlling the refrigerant amount in the heat-exchanging portion 110, the reaction temperature of hydrogen sulfide is controlled. A reactor for synthesizing hydrogen sulfide 100 illustrated in FIG. 7 includes temperature sensors 171 to 173 that sense the gas temperature provided downstream relative to heat exchangers 111, 112, and 113 constituting the heat-exchanging portion 110. The heat exchangers 111, 112, and 113 are respectively provided with flow control valves 174, 175, and 176 that adjust the refrigerant flow rate. The reactor for synthesizing hydrogen sulfide 100 further includes a controller 160 that controls the reaction temperature of hydrogen sulfide by controlling the flow control valves. When the gas temperature sensed by the temperature sensors 171 to 173 rises above a predetermined value, the controller 160 opens the flow control valves 171 to 173 to control the heat exchange amount of the heat exchangers 111 to 113 constituting the heat-exchanging portion 110, thereby removing heat so that the gas temperature becomes a predetermined value. The controller 160 is, for example, a distributed control system.

In the reactor for synthesizing hydrogen sulfide 500 illustrated in FIG. 2, the temperature of the top portion can be set to a predetermined value using a refrigerant flow control valve 552 of the heat exchanger 540 by means of a temperature controller 551 located at the top portion. However, the temperature of the entire gas-phase reaction region 530, in particular, the temperature in the vicinity of the surface of liquid sulfur cannot be controlled. Consequently, the reaction temperature rises in the region 530, and the $H_2S_2$ concentration exceeds the product specification. In contrast, in the reactor for synthesizing hydrogen sulfide 100 illustrated in FIG. 7, the heat exchange amount of the heat exchangers 111 to 113 constituting the heat-exchanging portion 110 is controlled such that the amount of heat removal on the side closer to the surface of liquid sulfur is increased and supercooling on the side farther from the surface of liquid sulfur is avoided. This enables temperature control of the entire gas-phase reaction region 102, and unlike the reactor illustrated in FIG. 2, a gas-phase reaction region in which the temperature is out of control is eliminated. Thereby, formation of hydrogen polysulfides and stopping of the hydrogen sulfide reaction are prevented.

Figure 8:
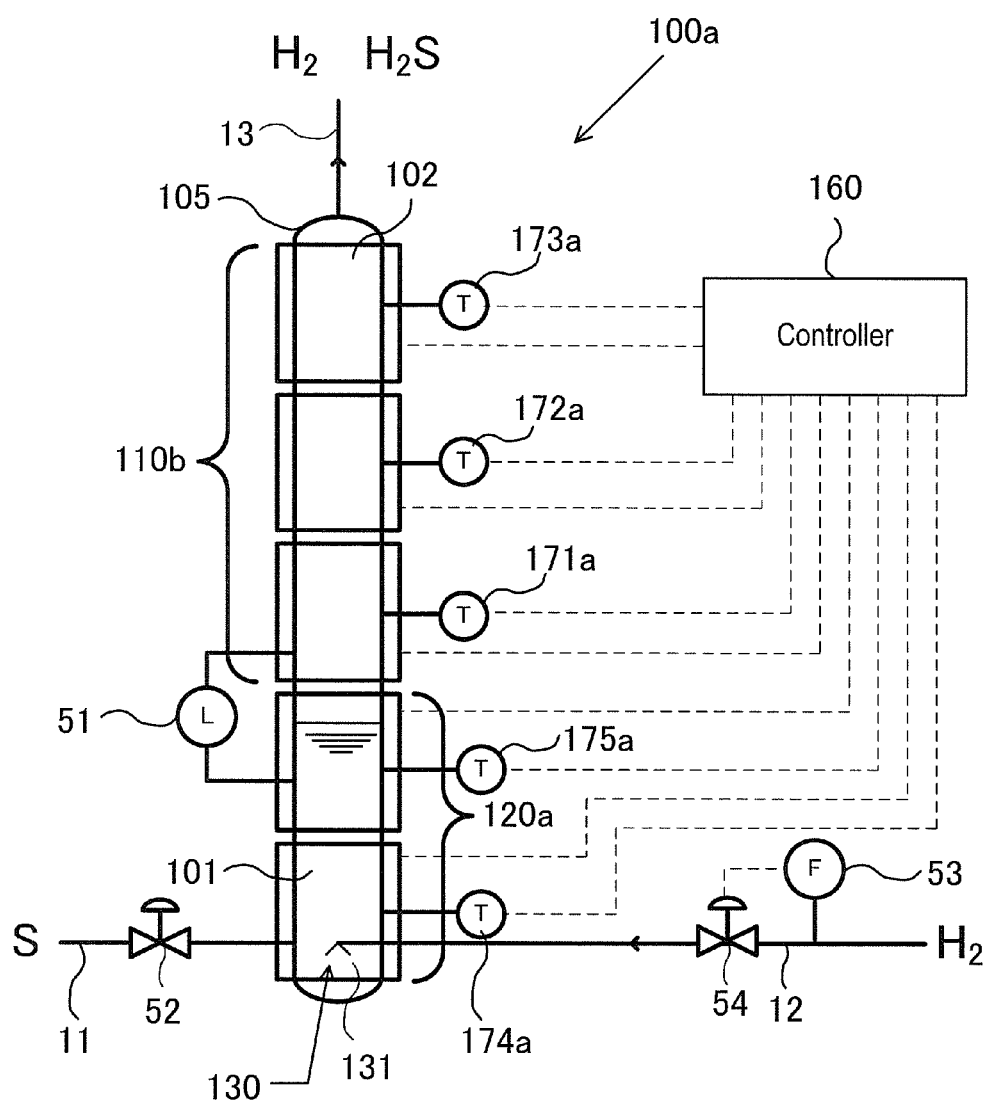
FIG. 8 is a view illustrating a second example of a reactor for synthesizing hydrogen sulfide.

FIG. 8 is a view illustrating a second example of a reactor for synthesizing hydrogen sulfide. In a reactor for synthesizing hydrogen sulfide 100a illustrated in FIG. 8, the column diameter of a reactor body 105a is smaller than that of the reactor for synthesizing hydrogen sulfide 100 illustrated in FIG. 3, and the area of heat exchange with the outside is large. Therefore, the amount of spontaneous heat release is large. A heating unit 120 provided on the outer surface of the bottom portion of the reactor body 105a includes electric heaters 121a and 122a and gasifies part of liquid sulfur. The power supply to the heating unit 120 is controlled by a controller 160 such that the temperature sensed by thermometers 174a and 175a is within a predetermined temperature range.

In the reactor for synthesizing hydrogen sulfide 100a, the inside of the reactor body 105 is used as a liquid sulfur-retaining portion 101 that retains liquid sulfur and as a gas-phase reaction region 102 which is a space where an uncatalyzed gas-phase reaction takes place. The heat-exchanging portion 110b includes electric heaters 111a to 113a. Since the column diameter is very small, the amount of spontaneous heat release is large around the reactor body 105a. In the case where heating is not performed with the electric heaters 111a to 113a, it is not possible to maintain a constant reaction temperature. The power supply to the electric heaters 111a to 113a is controlled by the controller 160 such that the temperature sensed by the thermometers 171a to 173a is within a predetermined temperature range. The electric heaters 111a to 113a are configured such that the heat exchange amount is the largest in the electric heater 111a located closest to the surface of liquid sulfur, and the heat exchange amount decreases in the order of the electric heater 112a and the electric heater 113a.

In such a manner, since the column diameter of the reactor body is small and the area of heat exchange with the outside is large, even in the case where the amount of spontaneous heat release is large, cooling of the reactor is suppressed by heating with the electric heaters. Since the hydrogen sulfide reaction heat decreases with increasing distance from the liquid surface, the amount of heat release also decreases with increasing distance from the liquid surface. Consequently, the heat exchange amount for heating with the electric heaters is set so as to decrease with increasing distance from the liquid surface. In this case, the temperature/pressure conditions for the reactor body 105a are the same as those inside the reactor for synthesizing hydrogen sulfide 100 described with reference to FIG. 3.

As described above, in the reactor for synthesizing hydrogen sulfide 100a, the reaction temperature in the gas-phase reaction region is controlled to be within a predetermined temperature range by changing the heat exchange amount per unit volume for heating in a gas-phase reaction region located farther from the liquid surface from the heat exchange amount per unit volume for heating in a gas-phase reaction region located closer to the liquid surface. Therefore, even in the case where the column diameter of the reactor body is small, it is possible to produce high-purity hydrogen sulfide by reducing formation of side reaction products.

[3] Apparatus for Producing Hydrogen Sulfide

Figure 9:
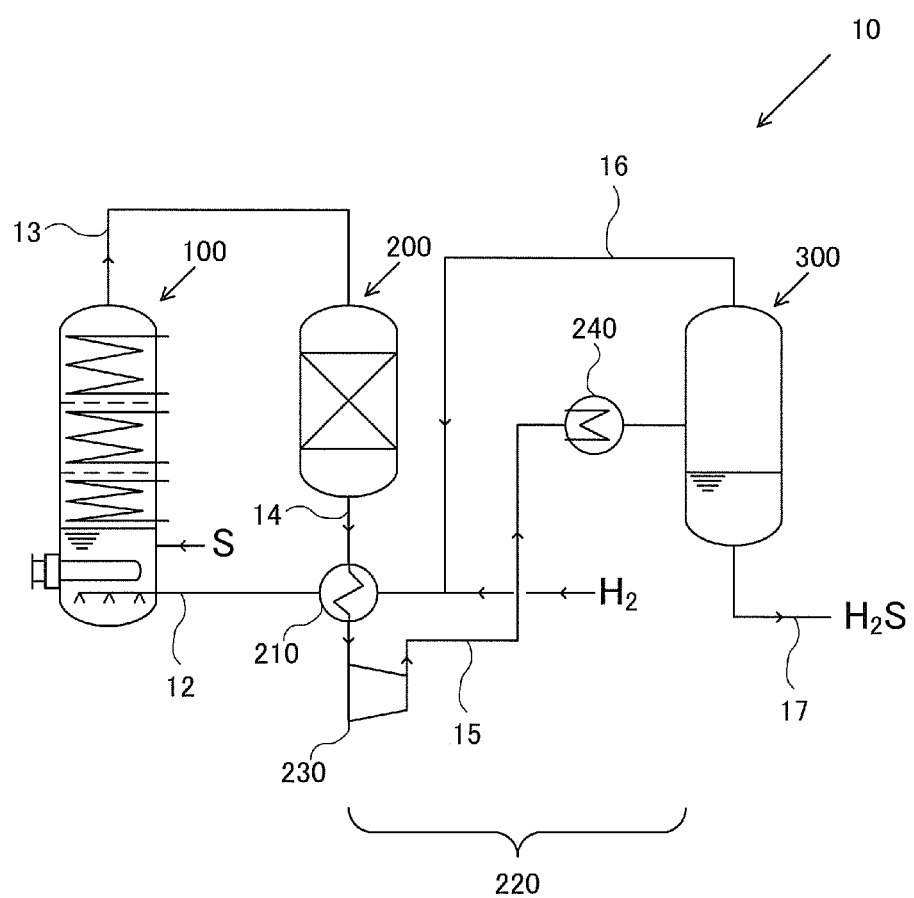
FIG. 9 is a view illustrating an example of an apparatus for producing hydrogen sulfide.

FIG. 9 is a view illustrating an example of an apparatus for producing hydrogen sulfide including the reactor for synthesizing hydrogen sulfide illustrated in FIG. 3. An apparatus for producing hydrogen sulfide 10 includes the reactor for synthesizing hydrogen sulfide 100 illustrated in FIG. 3, a hydrogenation reactor 200 that converts unreacted sulfur gas discharged together with hydrogen sulfide gas into hydrogen sulfide, a hydrogen gas heat exchanger 210 that performs heat exchange between high-temperature product gas and starting material hydrogen gas, a liquefier 220, and a gas-liquid separator 300 that separates hydrogen gas from liquefied hydrogen sulfide.

The inside of the hydrogenation reactor 200 is filled with a hydrogenation catalyst, such as a sulfide of Co—Mo or Ni—Mo, or $Ni_2S_2$. The hydrogenation reactor 200 receives hydrogen gas, sulfur gas, and hydrogen sulfide gas from the reactor for synthesizing hydrogen sulfide 100 through the line 13, and converts unreacted sulfur gas into hydrogen sulfide gas using hydrogen gas. Furthermore, hydrogen gas is separated by a gas-liquid separator 300 in the subsequent stage and reused in the reactor for synthesizing hydrogen sulfide 100.

Furthermore, since the sulfur gas concentration is substantially zero in the outlet gas from the hydrogenation reactor 200, downstream equipment related to removal of sulfur gas is not needed.

The liquefier 220 includes a product gas compressor 230 that compresses the product gas and a heat exchanger 240 that cools the product gas. The gas treated by the hydrogenation reactor 200 is supplied through a line 14 to the heat exchanger 210 and is subjected to heat exchange with low-temperature hydrogen gas supplied from the gas-liquid separator 300. The gas discharged from the heat exchanger 210 is compressed by the product gas compressor 230 and supplied to the heat exchanger 240 through a line 15. In the heat exchanger 240, for example, the gas is cooled at −30° C. and separated into liquid hydrogen sulfide and hydrogen gas by the gas-liquid separator 300. The hydrogen gas is supplied to the reactor body 110 through lines 16 and 12, and the liquefied hydrogen sulfide is shipped as a product through a line 17 or used in another process.

[4] Apparatus for Producing Sodium Hydrogen Sulfide

Figure 10:
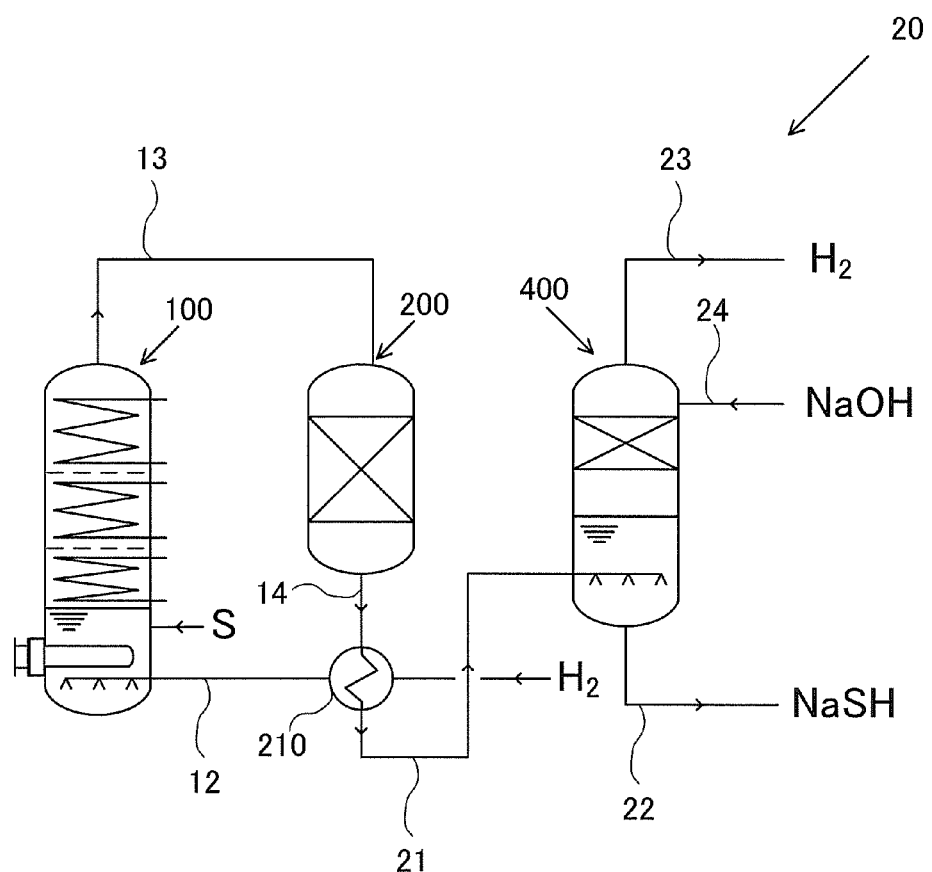
FIG. 10 is a view illustrating an example of an apparatus for producing sodium hydrogen sulfide.

FIG. 10 is a view illustrating an example of an apparatus for producing sodium hydrogen sulfide including the reactor for synthesizing hydrogen sulfide illustrated in FIG. 3. When compared with the apparatus for producing hydrogen sulfide 10 illustrated in FIG. 9, an apparatus for producing sodium hydrogen sulfide 20 illustrated in FIG. 10 does not include the product gas compressor 230, the cooler 240, and the gas-liquid separator 300, but includes a reactor for synthesizing sodium hydrogen sulfide 400 in which sodium hydrogen sulfide is formed from hydrogen sulfide and sodium hydroxide (NaOH).

Sodium hydrogen sulfide has the chemical reactions described below.

$$2NaOH+H_2S \rightarrow Na_2S+2H_2O \quad \text{(Formula 3)}$$

$$Na_2S+H_2S \rightarrow 2NaSH \quad \text{(Formula 4)}$$

$$NaOH+H_2S \rightarrow NaSH+H_2O \quad \text{(Formula 5)}$$

When hydrogen sulfide gas is brought into contact with an aqueous solution of sodium hydroxide, sodium hydroxide absorbs hydrogen sulfide to form sodium sulfide ($Na_2S$) in accordance with the (formula 3). When hydrogen sulfide gas is further brought into contact, sodium hydrogen sulfide (NaSH) is formed in accordance with the (formula 4). The formulae 3 and 4 can be combined into the formula 5. The soda/hydrogen sulfide supply ratio is 1.0 [mol/mol] from the formula 5.

The reactor for synthesizing sodium hydrogen sulfide 400 has a liquid layer including sodium hydroxide in the lower portion thereof. Mixed gas of hydrogen sulfide and hydrogen is supplied into the liquid layer to synthesize sodium hydrogen sulfide in accordance with the formula 5. Sodium hydroxide, in a stoichiometric amount needed for reaction of all the amount of hydrogen sulfide included in the starting material gas, is supplied from the upper part of the reactor for synthesizing sodium hydrogen sulfide 400. The reactor for synthesizing sodium hydrogen sulfide 400 has a packed bed, for example, filled with 1-inch Pall rings. By bringing sodium hydroxide and hydrogen sulfide into contact with each other in the packed bed, the concentration of the hydrogen sulfide gas discharged from a line 23 is decreased.

Furthermore, when hydrogen polysulfides ($H_2S_2$ in the example described below) are included in the hydrogen sulfide gas, a sodium polysulfide impurity is produced in accordance with the formula below.

$$2NaOH+H_2S_2 \rightarrow Na_2S_2+2H_2O \quad \text{(formula 6)}$$

Inclusion of a large amount of sodium polysulfides may degrade the quality of the product of the downstream reaction process. In the apparatus for producing sodium hydrogen sulfide 20, by preventing formation of hydrogen disulfide in the reactor for synthesizing hydrogen sulfide 100, formation of sodium polysulfides can be prevented.

In the apparatus for producing hydrogen sulfide 10, in order to liquefy and separate hydrogen sulfide, equipment, such as the product gas compressor 230, is needed. In the apparatus for producing sodium hydrogen sulfide 20, hydrogen sulfide gas is directly used and reacted with sodium hydroxide, and thus equipment, such as the product gas compressor 230, is not needed.

EXAMPLE

Hydrogen sulfide was synthesized using the reactor for synthesizing hydrogen sulfide 100 illustrated in FIG. 3. The reactor body 105 was, for example, made of stainless steel with an inner diameter of 1,200 mm and a height of 4,000 mm. Hydrogen gas heated to 200° C. was fed from the lower part of the reactor body 105 through the line 12, and liquid sulfur in the reactor for synthesizing hydrogen sulfide was heated to 410° C. with a heater.

In this example, hydrogen sulfide is formed under the following reaction conditions:

Reaction temperature 405 to 410 [° C.]

Reaction pressure 0.2 to 0.6 [MPaA]

Conversion 50 to 60 [mol %]

The hydrogen polysulfide concentration can be reduced to less than 10 ppm.

It was possible to suppress the change in the reaction temperature within 5° C. by the structure described above.

Hydrogen sulfide was synthesized using the reactor for synthesizing hydrogen sulfide 100a illustrated in FIG. 8. The reactor body 105 was made of stainless steel with a diameter of 80 mm (3 inch) and a height of 2,500 mm, and a sulfur condenser (not illustrated) was placed thereon. Electric heaters 120a and 110b, divided into five, are placed outside the reactor for the purpose of temperature control.

Hydrogen controlled to 600 NL/h by the flow controller 53 was preheated to 120° C. and supplied by a sparger 131, through the line 12, to the lower portion of the reactor 130 in which sulfur was retained. The reaction pressure was controlled to 0.6 MPaG. The electric heaters were controlled with the controller 160 such that the temperature inside the reactor was uniform. As a result, in the reaction portion, the lowest temperature was 422° C., the highest temperature was 431° C., and the average temperature was 429° C. Thus, satisfactory control was achieved.

Sulfur contained in the outlet of the reactor was condensed with a sulfur condenser (not illustrated), and remaining sulfur was fully converted into hydrogen sulfide with a catalyst reactor (also not illustrated). Then, the gas was analyzed. As a result, hydrogen sulfide was 54%, hydrogen was 46%, and $H_2S_2$ was 10 ppm.

The embodiments described above are merely typical examples, and combinations of the components of the embodiments, modifications, and variations are apparent to persons stilled in the art. Persons skilled in the art may make various modifications of the embodiments without departing from the principle and scope of the invention as defined by the appended claims.

What is claimed is:

1. A reactor for synthesizing hydrogen sulfide in which sulfur and hydrogen are subjected to gas-phase reaction in the absence of a catalyst to synthesize hydrogen sulfide, the reactor comprising:

a reactor body that retains liquid sulfur in a bottom portion thereof;

a heating unit that gasifies part of the liquid sulfur;

a hydrogen gas supply unit that supplies hydrogen gas into the liquid sulfur; and a heat-exchanging portion provided in a gas-phase reaction region located above the liquid surface of the liquid sulfur in the reactor body, wherein the heat-exchanging portion is configured such that the reaction temperature in the gas-phase reaction region is controlled to be within a predetermined temperature range by changing the heat exchange amount per unit volume in a gas-phase reaction region located farther from the liquid surface from the heat exchange amount per unit volume in a gas-phase reaction region located closer to the liquid surface.

2. The reactor for synthesizing hydrogen sulfide according to claim 1, wherein the heat-exchanging portion is configured such that the heat exchange amount per unit volume decreases with increasing distance from the liquid surface.

3. The reactor for synthesizing hydrogen sulfide according to claim 1, wherein the heat-exchanging portion is configured such that the heat-transfer area per unit volume in the gas-phase reaction region located closer to the liquid surface is larger than the heat-transfer area per unit volume in the gas-phase reaction region located farther from the liquid surface.

4. The reactor for synthesizing hydrogen sulfide according to claim 1, wherein the predetermined temperature range is 380° C. to 410° C.

5. The reactor for synthesizing hydrogen sulfide according to claim 1, wherein a refrigerant of the heat-exchanging portion is supplied at a temperature equal to or higher than the freezing point of sulfur.

6. The reactor for synthesizing hydrogen sulfide according to claim 1, wherein the heat-exchanging portion comprises a plurality of heat exchangers.

7. The reactor for synthesizing hydrogen sulfide according to claim 1, wherein the heat-exchanging portion is provided with a flow-straightening member that has a plurality of holes through which the gas passes.

8. The reactor for synthesizing hydrogen sulfide according to claim 1, further comprising:
    a temperature sensor that senses the gas temperature of the gas-phase reaction region; and
    a controller that controls the heat exchange amount in each heat-exchanging portion such that the sensed temperature is a predetermined value.

9. The reactor for synthesizing hydrogen sulfide according to claim 1, wherein, in the case where the amount of heat released from the surface of the reactor body is larger than the amount of heat generated by the hydrogen sulfide reaction heat, the heat-exchanging portion is configured so as to heat the reactor body in order to maintain the reaction temperature in the gas-phase reaction region within a predetermined temperature range.

10. An apparatus for producing hydrogen sulfide comprising:
    the reactor for synthesizing hydrogen sulfide according to claim 1; and
    a hydrogenation reactor that synthesizes hydrogen sulfide by reacting unreacted sulfur gas and hydrogen gas discharged from the reactor for synthesizing hydrogen sulfide using a hydrogenation catalyst.

11. The apparatus for producing hydrogen sulfide according to claim 10, further comprising a liquefier that liquefies hydrogen sulfide.

12. An apparatus for producing sodium hydrogen sulfide in which sodium hydrogen sulfide is synthesized, the apparatus comprising:
    the reactor for synthesizing hydrogen sulfide according to claim 1;
    a hydrogenation reactor that synthesizes hydrogen sulfide by reacting unreacted sulfur gas and hydrogen gas discharged from the reactor for synthesizing hydrogen sulfide using a hydrogenation catalyst; and
    a reactor for synthesizing sodium hydrogen sulfide in which hydrogen sulfide is reacted with an aqueous sodium hydroxide solution to synthesize sodium hydrogen sulfide.

13. A method for producing hydrogen sulfide in which sulfur and hydrogen are subjected to gas-phase reaction in the absence of a catalyst to synthesize hydrogen sulfide, the method comprising the steps of:
    heating part of liquid sulfur retained in a lower portion of a reactor;
    supplying hydrogen gas into the liquid sulfur;
    subjecting sulfur gas generated by the heating and the hydrogen gas to gas-phase reaction in a gas-phase reaction region located above the liquid surface of the liquid sulfur in the reactor; and
    removing heat such that the reaction temperature in the gas-phase reaction region is controlled to be within a predetermined temperature range by changing the heat exchange amount per unit volume in a gas-phase reaction region located farther from the liquid surface from the heat exchange amount per unit volume in a gas-phase reaction region located closer to the liquid surface.

14. The method for producing hydrogen sulfide according to claim 13, wherein, in the step of removing heat, heat is removed such that the heat exchange amount per unit volume decreases with increasing distance from the liquid surface.

15. The method for producing hydrogen sulfide according to claim 13, wherein the predetermined temperature range is 380° C. to 410° C.

16. The method for producing hydrogen sulfide according to claim 13, wherein the heat removal is performed using a refrigerant at a temperature equal to or higher than the freezing point of sulfur.

17. The method for producing hydrogen sulfide according to claim 13, wherein the gas passes through a flow-straightening member having a plurality of holes provided in a heat-exchanging portion where the heat removal is performed.

18. The method for producing hydrogen sulfide according to claim 13, wherein unreacted sulfur gas and hydrogen gas discharged from the reactor for synthesizing hydrogen sulfide are reacted with each other using a hydrogenation catalyst to perform conversion into hydrogen sulfide.

19. The method for producing hydrogen sulfide according to claim 13, wherein, the step of removing heat comprises a step of heating in order to maintain the reaction temperature in the gas-phase reaction region within a predetermined temperature range in the case where the amount of heat released from the surface of the reactor body is larger than the amount of heat generated by the hydrogen sulfide reaction heat.

20. The method for producing hydrogen sulfide according to claim 13, wherein hydrogen sulfide is liquefied.

21. A method for producing sodium hydrogen sulfide in which sodium hydrogen sulfide is formed, the method comprising:
    reacting hydrogen sulfide formed by the method for producing hydrogen sulfide according to claim 13 with an aqueous sodium hydroxide to form sodium hydrogen sulfide.

* * * * *